US008705946B2

(12) United States Patent
Takashima et al.

(10) Patent No.: US 8,705,946 B2

(45) Date of Patent: Apr. 22, 2014

(54) 3D AUTHORING TOOL ENSURING NO BUFFER UNDERRUN UPON JUMPS

(75) Inventors: Yoshikazu Takashima, Los Angeles, CA (US); Michael Thompson, Los Angeles, CA (US)

(73) Assignees: Sony Corporation, Tokyo (JP); Sony Pictures Technologies Inc, Culver City, CA (US)

( * ) Notice: Subject to any disclaimer, the term of this patent is extended or adjusted under 35 U.S.C. 154(b) by 9 days.

(21) Appl. No.: 13/298,599

(22) Filed: Nov. 17, 2011

(65) Prior Publication Data

US 2012/0128324 A1 May 24, 2012

Related U.S. Application Data

(60) Provisional application No. 61/415,661, filed on Nov. 19, 2010.

(51) Int. Cl.
*H04N 5/84* (2006.01)

(52) U.S. Cl.
USPC ........... 386/335; 386/341; 386/344; 386/232; 386/248; 348/42

(58) Field of Classification Search
USPC ............. 386/335, 341, 344, 232, 248; 348/42
See application file for complete search history.

(56) References Cited

U.S. PATENT DOCUMENTS

| | | | | |
|---|---|---|---|---|
| 6,393,196 | B1 | 5/2002 | Yamane et al. | |
| 6,512,882 | B1 | 1/2003 | Teunissen | |
| 8,520,053 | B2 * | 8/2013 | Pun et al. | 348/14.1 |
| 2004/0076402 | A1 | 4/2004 | Jung et al. | |
| 2008/0226265 | A1 | 9/2008 | Takashima et al. | |
| 2010/0245548 | A1 | 9/2010 | Sasaki et al. | |
| 2011/0013884 | A1 | 1/2011 | Sasaki et al. | |
| 2011/0033170 | A1 | 2/2011 | Ikeda et al. | |
| 2012/0293614 | A1 * | 11/2012 | Ikeda et al. | 348/42 |

FOREIGN PATENT DOCUMENTS

| | | |
|---|---|---|
| WO | 2004088660 | 10/2004 |
| WO | 2005/024824 | 3/2005 |
| WO | 20101095443 | 8/2010 |

* cited by examiner

*Primary Examiner* — Helen Shibru

(74) *Attorney, Agent, or Firm* — Mark D. Wieczorek; Mayer & Williams PC

(57) ABSTRACT

Systems and methods are provided to implement a technique for providing 3D content, such as on optical media like Blu-ray® discs. In one implementation, a 3D authoring tool executing on a computer system manages how to construct an image for replication where the image handles jumps without buffer underruns, the jumps caused by layer switching or by moving from or to branches in a multi-branch story line.

18 Claims, 16 Drawing Sheets

50
Start
80
3D Stream File
Step1
82
84
D B D B D B D B D B D B
Long jump Capable points
86i
86j
86k
Step2
82
84
86i'
D B D B D B D B D B D B
Layer Break
Check Functions
Seamless playback condition check
92
Layer Size Check
Master Creation
94
FileSystem Image, Master Data generation

*3D Stream Layer Break*
*[PRIOR ART]*

Multi Story
[PRIOR ART]
30
42
44
46
48
Start
A
B1
B2
C
Interleave Sequence B1 and B2
Jump distance < 640000 sectors (1.28GB)
42
44(1)
46(1)
44(2)
46(2)
48
Step 1
A
B1[1]
B2[1]
B1[2]
B2[2]
C
3D playback path
52
Check
Functions
Seamless playback condition check
54
Layer Size Check
56
Master
Creation
FileSystem Image, Master Data generation 3D Stream Multi Story
[PRIOR ART]
40
62
64
66
68
Start
A
B1
B2
C
Step 1
62i
62j
64j
64i
66j
66i
68i
68j
Interleave Sequence B1 and B2
Jump distance < 640000 sectors (1.28GB)
Step 2
64(1)j
66(1)i
64(2)i
66(2)i
3D playback path
Seamless playback condition check
72
Check Functions
74
Layer Size Check
76
FileSystem Image, Master Data generation
Master Creation 3D Stream Multi Story
70
102
104
106
108
Start
A
B1
B2
C
Step 1
102i
102j
104j
104i
106j
106i
108i
108j
110i
110j
110k
Long jump Capable points
Interleave Sequence B1 and B2
Jump distance < 640000 sectors (1.28GB)
Step 2
104(1)i,j
106(1)i,j
104(2)i,j
106(2)i,j
3D playback path
Check Functions
Seamless playback condition check
112
Layer Size Check
114
Master Creation
FileSystem Image, Master Data generation

110

```
(INTERLEAVE)Interleave function for 3D Stream to process extents.
  result = NG;
  Get estimate Div_num based on the total SSIF file size;
  While (all EXTSS satisfies Conditions){                    //To satisfy Conditions always
    Divide SSIF File to Div_num of EXTSSs.
    if (longest jump with current Div_num < 640000 sectors){
        result = OK;
              Save current interleaving status;
        break;
    }
   Div_num++;  (*INTERLEAVE)
  }
```

3D AUTHORING TOOL ENSURING NO BUFFER UNDERRUN UPON JUMPS

CROSS-REFERENCE TO RELATED APPLICATIONS

This application claims benefit of priority of U.S. Provisional Patent Application Ser. No. 61/415,661, filed Nov. 19, 2010, entitled "3D Authoring Tool", owned by the assignee of the present invention and herein incorporated by reference in its entirety.

FIELD OF THE INVENTION

The invention relates to 3D authoring tools, and more particularly to authoring tools that provide for smooth jumps from one media point to another.

BACKGROUND OF THE INVENTION

In the Blu-ray® specification, 3D stream files can be played by both 2D players and 3D players. A 3D player will read the entire 3D stream, while a 2D player reads only the 2D portion of the stream, which includes 2D video as well as audio streams.

The above specification defines two types of 3D streams: 1TS and 2TS. The 1TS stream includes both base view video and dependent view video in a single transport stream. This transport stream is maximum bit rate limited to 48 Mbps, so in general this type does not have a high enough bit rate to multiplex high quality 3D video with multiple high-quality audio streams. The 2TS stream files have a maximum total bit rate for the base and dependent transport streams of 64 Mbps and thus has enough bit rate to carry high-quality 3D video and audio.

The 2TS stream includes base view video and audio streams in one transport stream file, and includes dependent view video in another transport stream. As a result, the base view video is often larger in extent, and often has a higher bit rate. In fact, the dependent view bit rate may approach zero if the view varies very little from the base view, because of the way MVC encodes data.

The 2TS stream files are interleaved, and as noted incorporate base view blocks and dependent view blocks. Such stream files are stored as one hybrid file termed an SSIF file in the Blu-ray® specification, where SSIF refers to a stereoscopic interleaved file.

In more detail, in one implementation, and referring to prior art FIG. 1, an architecture 10 includes a 2TS 3D stream file 16 that includes a base view transport stream (TS) file 12 and a dependent view TS file 14. The 3D stream file 16 is broken into a set of base view blocks 22*j* and a set of dependent view blocks 18*i*. Both are employed for 3D playback, e.g., base view for left eye and dependent view for right eye, or vice-versa, and just the base view 22*j* is used for 2D playback.

When a player performs a drive seek to read the blocks of the AV (audiovisual) stream, the player needs to buffer enough AV stream data to a read buffer to continue smooth playback, at least until the drive starts reading new AV stream data after a jump.

Two situations require special handling: playback over an optical media layer jump and play back in a multi-story branching situation (FIGS. 2-4). Referring first to the layer break jump illustrated by the sequence 20 in prior art FIG. 2, a 3D stream file 24 is multiplexed into a base view and dependent view of the 3D stream, and a number of base view blocks 26*i* and dependent view blocks 28*j* are defined. A layer break 32*k* is established where desired, and the same may be estimated using time codes or file sizes. The layer break 32, which usually constitutes a long jump, is typically set at the block boundary closest to the requested timecode or file size. In many cases, current authoring systems employ "parameters-A" to determine the jump point. These may include AV stream maximum bit rate, drive jump performance, and jump distance, or a sub combination of these. In many cases, the target jump point is determined by stream file size, then evaluated based on the parameters-A.

The Blu-ray® specification then sets a number of conditions that must be established for seamless playback, and these are checked, for a proposed jump point, in step 34. If seamless playback does not occur, the layer break is moved, i.e., a different layer break point is attempted. If seamless playback is achieved, a layer size check 36 is performed to ensure the layer size does not exceed the maximum size set for the medium and further such that the first layer size is larger than or equal to the second layer size as required in the Blu-ray® specification. Finally, a file system image is created, e.g., a master disc is created in step 38.

FIG. 3 illustrates a prior art method 30 for a medium including 2D multi-story branching. The 2D stream is shown with a multi-story playback path set up including chapters A (42), B (44/46), and C (48), where B has two alternative branches B1 (44) and B2 (46). In the case where the size of B1 or B2 is larger than a maximum jump distance, B1 and B2 are interleaved to keep the jump distance less than the maximum. For example B1 (44) and B2 (46) may be further broken up into (for B1) B1[1]=44(1) and B1[2]=44(2); and (for B2) B2[1]=46(1) and B2[2]=46(2). That is, the components of B1 and B2 are interleaved such that the maximum jump distance is less than a predetermined maximum, e.g., 640,000 sectors or 1.28 Gb for a current Blu-ray® disc to cap the drive seek time. Sample playback paths are illustrated, both for branch A-B2-C (bottom path) and for branch A-B1-C (top path).

As in FIG. 2, a seamless playback check is performed in step 52. If seamless playback does not occur, the interleaving is performed again in a different way. As above, a layer size check 54 is performed to ensure the layer size does not exceed the maximum size set for the medium and that the first layer size is larger than or equal to the second layer size as required in the Blu-ray® specification. Finally, a file system image is created, e.g., a master disc is created in step 56.

FIG. 4 illustrates a prior art method 40 for a medium including 3D multi-story branching. The 3D stream is shown as set up with a multi-story playback path having chapters A (62), B (64/66), and C (68), where B has two alternative branches B1 (64) and B2 (66). All of the chapters or 3D stream files are shown divided into base and dependent view blocks 62*i*, 62*j*, 64*i*, 64*j*, 66*i*, 66*j*, 68*i*, and 68*j*. Where B1 or B2 are larger than a maximum jump distance, the two may be interleaved to keep the jump distance less than a maximum. Again, this maximum jump distance is currently about 1.28 GB. As an example of interleaving, B1 (64) and B2 (66) are further broken up into (for B1) B1[1] and B1[2]; and (for B2) B2[1] and B2[2]. The interleaving is such that the maximum jump distance is less than the predetermined maximum. Sample playback paths are illustrated, both for branch A-B2-C (bottom path) and for branch A-B1-C (top path).

Again, a seamless playback check is performed in step 72. Following the seamless playback check, a layer size check 74 is performed to ensure the layer size does not exceed the maximum size set for the medium. Finally, a file system image is created, e.g., a master disc is created in step 76.

SUMMARY OF THE INVENTION

Systems and methods are provided to implement techniques for providing 3D content, such as on optical media like Blu-ray® discs. In one exemplary implementation, a 3D authoring tool executing on a computer system manages how to construct an image for replication where the image is constructed to handle jumps without buffer underruns, the jumps caused by, e.g., layer switching or by moving from or to branches in a multi-branch story line.

In one embodiment of the system and method, a feature is provided to an optical medium authoring tool that controls where jumps (to another layer or to another point on the same layer) may be made without the danger of a buffer underrun, such resulting in unacceptable playback quality.

In certain implementations of the system and method, instead of using the "parameters-A" as noted above in prior art systems, a different group of parameters, "parameters-B", and especially AV stream local bit rate and jump distance, are employed to determine all the acceptable jump points for a given 2D or 3D stream. Jump capability flags are set at these points, and if a jump is required, the same is made at these points, which eliminates the chance for a buffer underrun. Accordingly, there is no need to perform seamless playback condition checks as was previously required. While jump capability flags are disclosed as a convenient way to identify appropriate points, it will be understood by one of ordinary skill in the art that any way of noting such points may be employed, and that the use of flags is merely exemplary.

In one exemplary method, for a given 3D stream file, a first step may be to define base view blocks and dependent view blocks. When defining these, parameters such as local bit rate and jump distance may be employed to determine where to set jump capability flags, these flags determining whether a long jump could be placed after a given base or dependent view block. In essence, the jump capability flags determine where long jumps can be made without buffer underrun, ensuring seamless playback. In the 3D situation, the local bit rates of 3D block (sequence of both the base and dependent view blocks) and 2D block (base view block) both may be employed to determine if a point is jump capable.

In more detail, a common reason why such buffer under runs may occur is because a long jump is attempted when the local bit rate before the long jump point is too high. In particular, if each block before a long jump is larger than the minimum extent size, seamless playback will be guaranteed because buffered data from a minimum extent block will be sufficient to provide data for display while the jump is being made. However, the bit rate cannot be too high, or else too much data will be demanded. Consequently, the minimum extent size can be calculated by the bit rate of each block, i.e., the block bit rate leads to a determined minimum extent size. As in the 2D case, a 3D block bit rate leads to a minimum 3D extent size and a 2D block bit rate leads to a minimum 2D extent size. Put another way, if a block is too short, a jump cannot be made after it.

The system and method may be employed in a number of different specific scenarios. Particularly pertinent situations include where playback occurs over an optical medium layer jump, i.e., one where an optical layer is being read and the reading continues onto another optical layer. In general, for multilayer recording, at least one such layer jump will occur. In many cases, for layer jumps, at most 40,000 sectors may be jumped, because of the time necessary to refocus the reading laser on the new layer. Another situation involving long jumps is where a title includes multi-story branches, and the jump occurs at a branching point of the stories. Still another is where a title includes multiple angles, and the user may be enabled to switch from one angle to another. In these cases, if the same layer is being read, i.e., no layer jump is required, a long jump may be over more sectors, e.g., 640,000.

The system and method may be employed in the authoring of both 2D and 3D media streams. Where the two are linked, e.g., in the Blu-ray® specification, the feature would be generally applied to both.

In one aspect, the invention is directed to a method of preparing a 3D media stream such that long jumps do not result in buffer underruns, including: a) receiving a 3D media stream; b) dividing the 3D media stream into a set of base view blocks and dependent view blocks; c) for a first base view block, employing at least a local bit rate in a calculation to determine if a long jump during 2D playback may be made to a second block without the occurrence of a buffer underrun; d) for a first 3D block, which is a pair of base view block and dependent view blocks, employing at least a local bit rate in a calculation to determine if a long jump during 3D playback may be made to a second block without the occurrence of a buffer underrun; e) if a long jump may be made to the second block without the occurrence of a buffer underrun, then configuring the media stream to allow long jumps following the first base view block; and f) creating a file system image or master disc image from the divided and configured media stream.

Implementations of the invention may include one or more of the following areas the configuring may include setting a jump capability flag at the first block, and where each block has a temporal beginning and a temporal end, and where the setting includes setting the jump capability flag at the temporal end of the first block. The local bit rate may be an average bit rate of a block. The method may further include, for a first dependent view block, using at least a local bit rate to determine if a long jump may be made to another block without the occurrence of a buffer underrun, and if so, then setting a jump capability flag following the first dependent view block. The employing may further include employing a jump distance in the calculation to determine if a long jump can be made to a second block without the occurrence of a buffer underrun. The 3-D media stream may have a beginning base view block and an ending base view block, and the ending base view block may have an extent that is as large as possible while maintaining the size requirement satisfied for the base view blocks that precede it. The ending base view block may have an extent that is larger than all of the base view blocks that precede it in the 3D media stream. The average local bit rate of the base view blocks may be between two and four times the average local bit rate of the dependent view blocks. The method may further include configuring the file system image or master disc image for a Blu-ray Disc®. The local bit rate may be employed in a calculation of a minimum block size, and if a given base view block size is greater than the minimum block size, and if a given 3D block size is greater than the minimum block size, then the method may further include allowing a long jump at the given base view and 3D block. The long jump may be associated with a media layer jump. The configuring may include setting a jump capability flag at the first block, and the method may further include selecting a layer break from among the long jump capable points, the layer break selected to keep a layer size less than a maximum layer size. The selecting may further include selecting the layer break such that layers created thereby have a layer size within a predetermined range of sizes. The long jump may be associated with a multi-story branching point. The set of base view blocks and dependent view blocks may be further organized into story chapters, at least one story chapter divided into a plurality of branches, and the method may further include: a) subdividing at least one branch into two or more groups of base and dependent view blocks; and b) interleaving at least one group of base and dependent view blocks associated with one branch into a point between two groups of base and dependent view blocks associated with another branch, the point chosen where a long jump is allowed, and where a jump distance associated with the long jump is less than a maximum jump distance. The maximum jump distance may be between 320000 sectors and 640000 sectors.

In another aspect, the invention is directed towards a non-transitory computer-readable medium, including instructions for causing a computing device to perform the above method.

In another aspect, the invention is directed towards a system for preparing a media stream for seamless playback over a jump, the seamless playback ensuring a minimum of offer underruns, including: a) memory bearing computer readable instructions capable of analyzing a 3D stream file and dividing the 3D stream file into a series of base view and dependent view blocks; and b) memory bearing computer readable instructions capable of selecting one or more points between the blocks in the series, the points chosen as long jump capable points, the long jump capable points representing locations where a long jump may be made without the occurrence of a buffer underrun.

Implementations of the invention may include one or more of the following. The long jump may be for a layer jump, and the system may further include memory bearing computer readable instructions capable of choosing a layer break, the layer break chosen at a location where a long jump may be made, and where the layer break is chosen such that the layer size is less than a predetermined maximum. The long jump may be for a multi-story branching point, the multi-story including at least two chapters, at least one of the chapters having at least two branches, at least two of the branches each having at least two groups of base and dependent view blocks, and further including memory bearing computer readable instructions capable of interleaving at least one group of base and dependent view blocks associated with one branch into a point between two groups of base and dependent view blocks associated with another branch, the point chosen where a long jump is allowed, and where a jump distance associated with the long jump is less than a maximum jump distance. The system may further include memory bearing computer readable instructions capable of creating a final base view block associated with the media stream, the final base view block larger than preceding base view blocks of the media stream.

Advantages of the invention may include one or more of the following. Authoring tools may be provided that have a highly useful feature of reducing or eliminating the occurrence of buffer underruns during media playback. The feature may be applied to reduce buffer underruns during layer jumps, during jumps within multi-story branching, or in other scenarios.

Other advantages will be apparent to one of ordinary skill in the art given the teaching herein.

BRIEF DESCRIPTION OF THE DRAWINGS

FIGS. 10(A)-(D) illustrate another aspect according to the principles disclosed here for multi-story branching that may be employed in certain implementations, showing in particular a process for interleaving.

DETAILED DESCRIPTION

Figure 1:
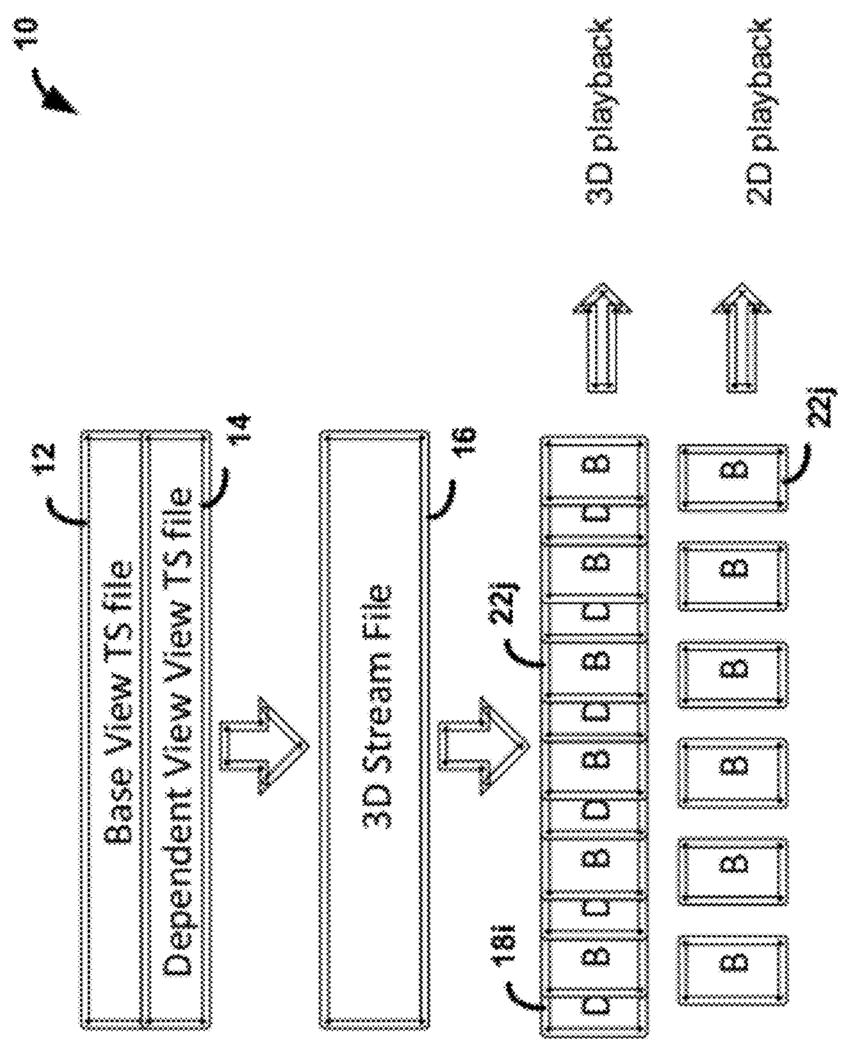
FIG. 1 illustrates a prior art process for dividing a 3D media stream into base and dependent view blocks.
Figure 2:
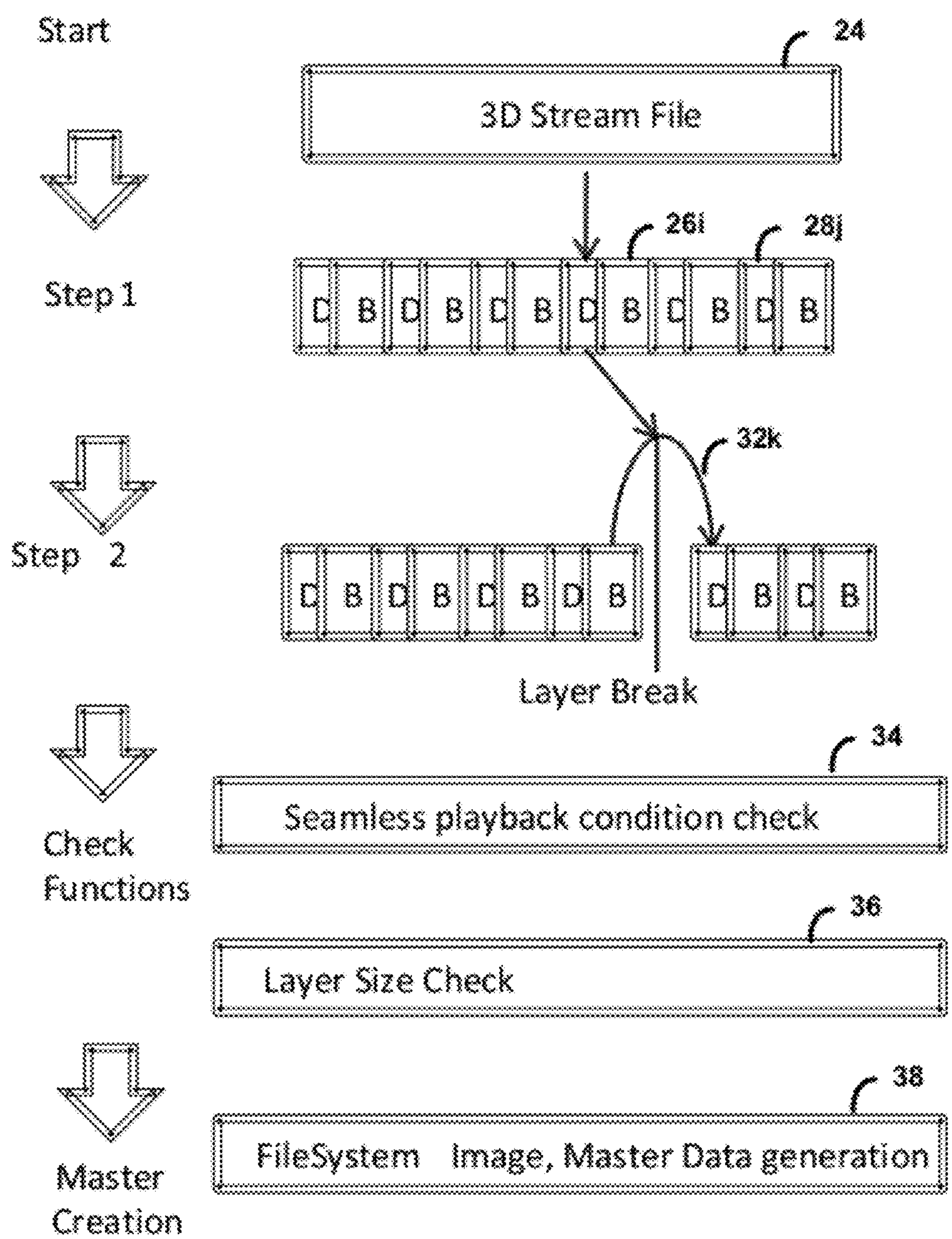
FIG. 2 illustrates a prior art process for dividing a 3D media stream into base and dependent view blocks and for performing a layer break.
Figure 3:
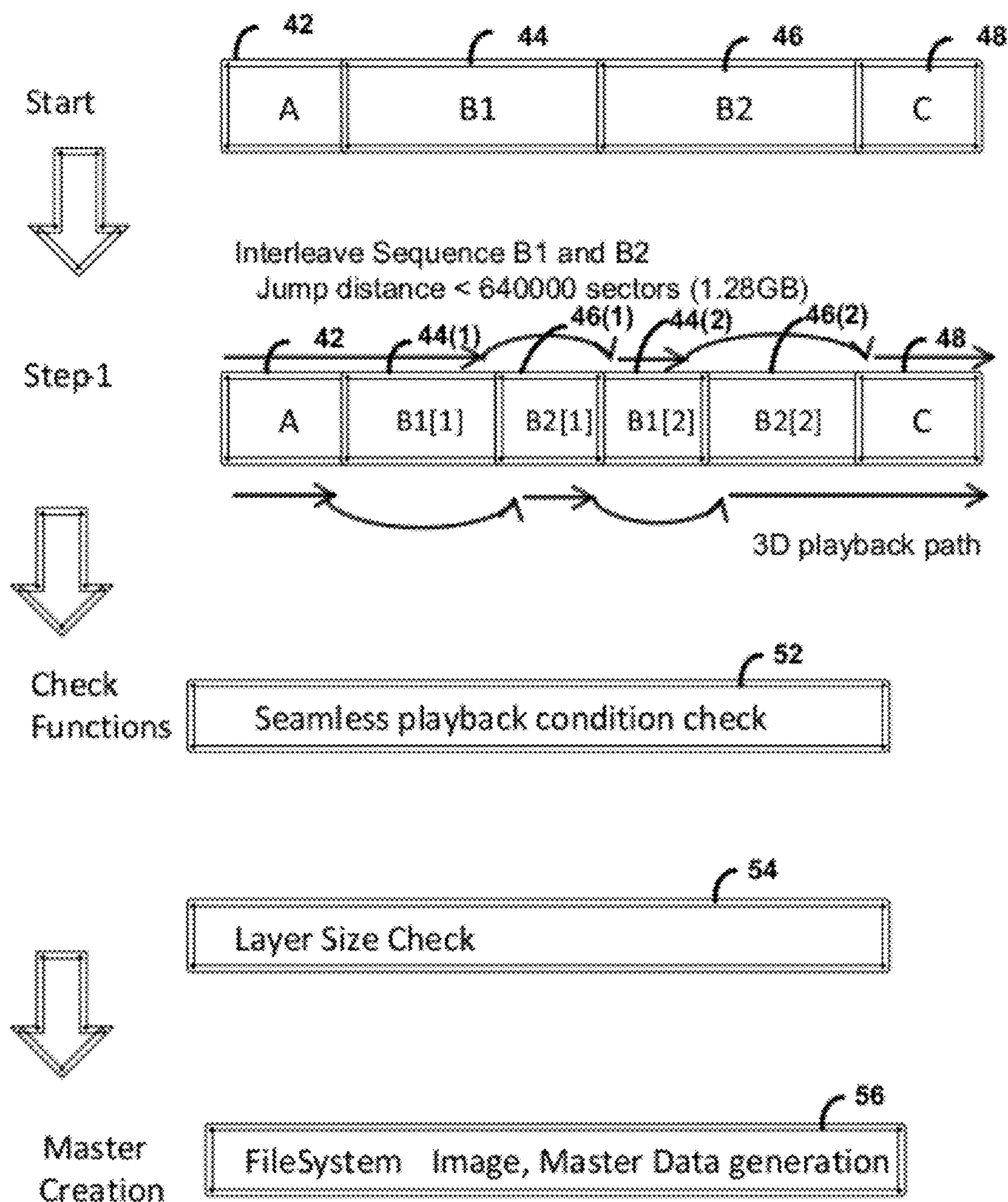
FIG. 3 illustrates a prior art process for dividing a media stream into base and dependent view blocks in a 2D multi-story branching situation.
Figure 4:
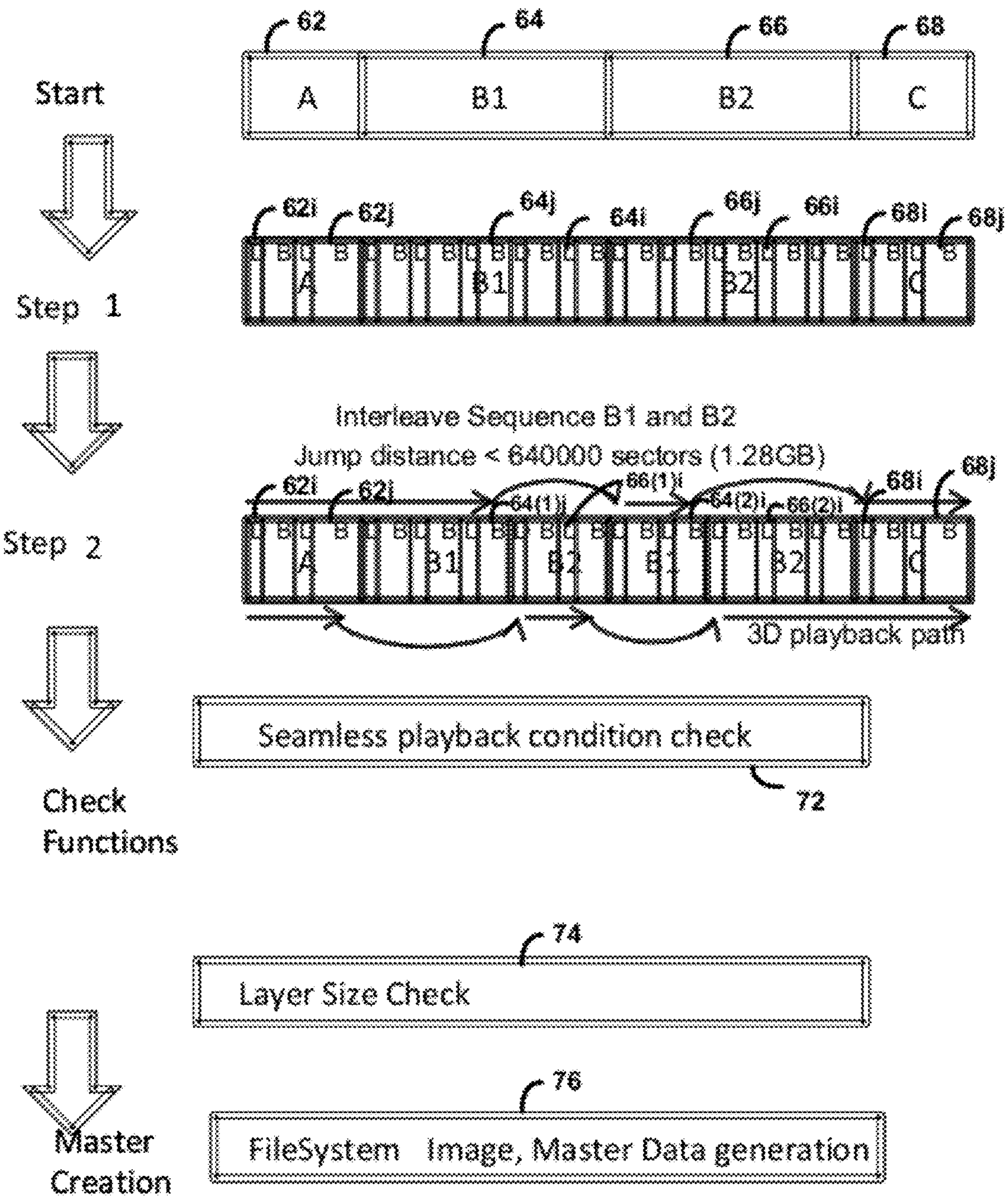
FIG. 4 illustrates a more detailed prior art process for dividing a 3D media stream into base and dependent view blocks in a multi-story branching situation.
Figure 5:
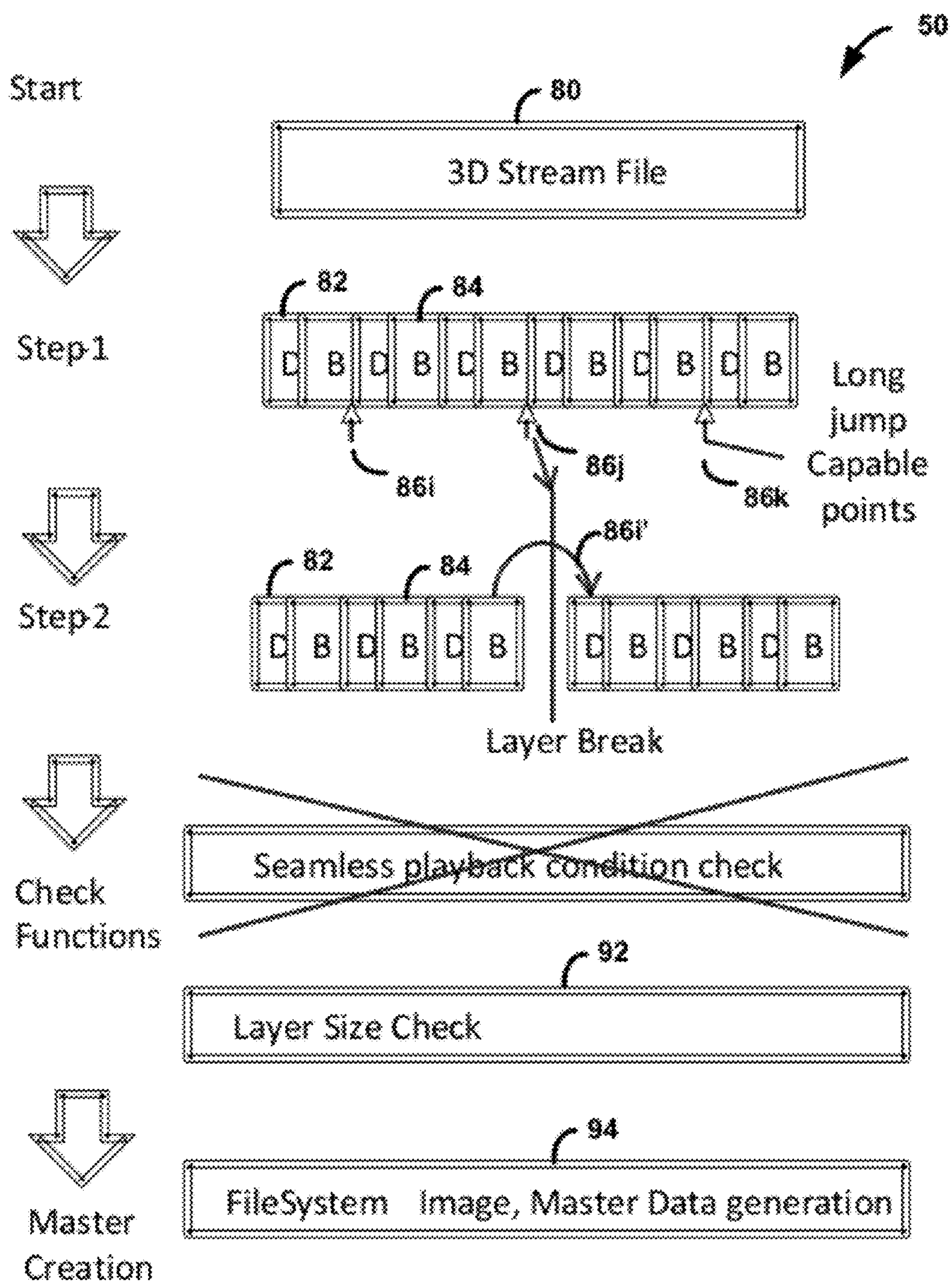
FIG. 5 illustrates a process according to principles disclosed here for preparing a 3D media stream to play smoothly even during long jumps over layers, without buffer underruns.
Figure 6:
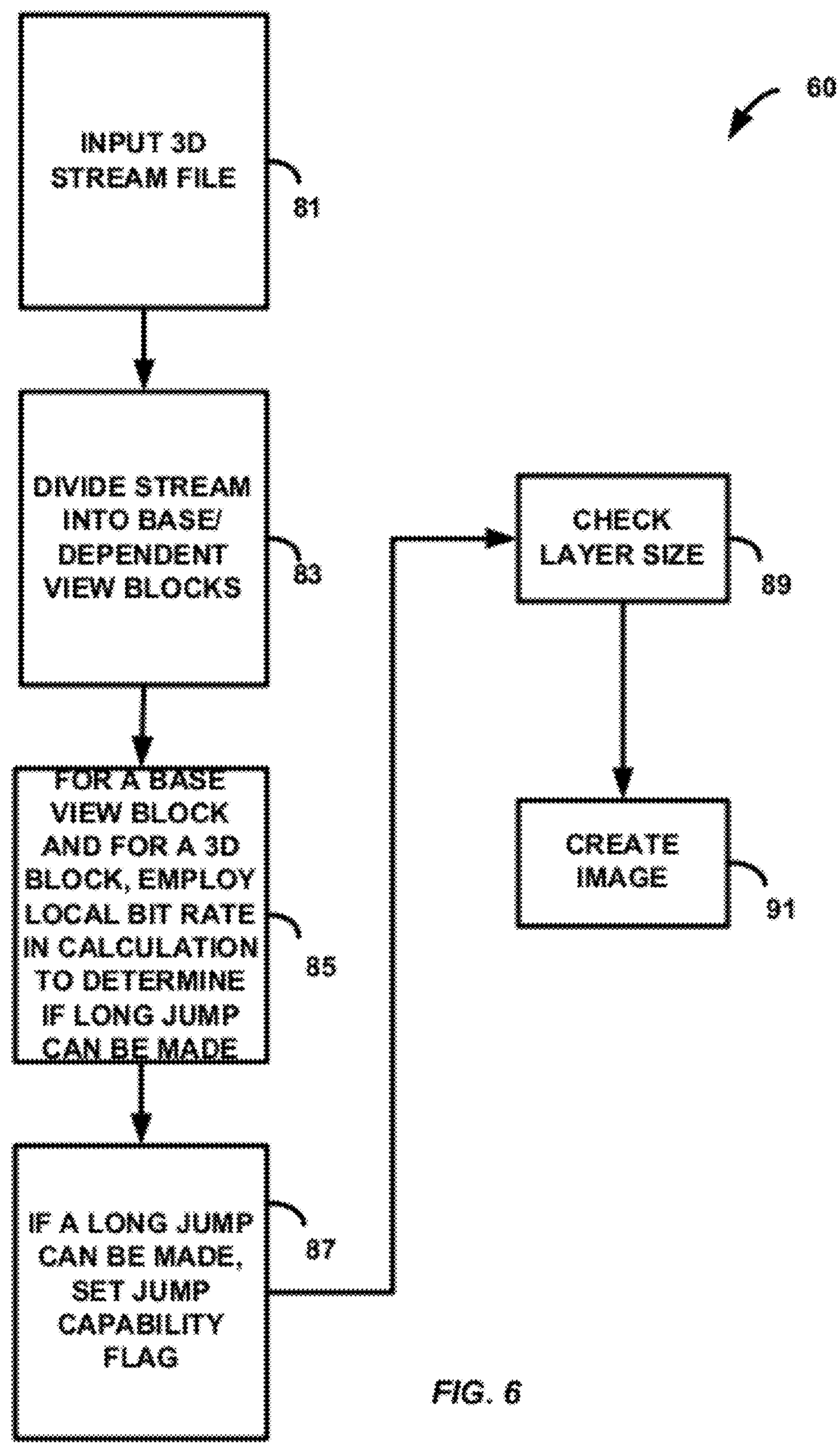
FIG. 6 illustrates a flowchart corresponding to FIG. 5.

Referring to FIGS. 5 and 6, a process 50 with accompanying flowchart 60 are illustrated according to one implementation of the invention. In this implementation, a 3D stream is prepared in such a way that seamless playback will occur over a layer break, even without a (previously required) seamless playback condition check.

Initially a 3D stream file 80 is input (step 81) and multiplexed into base and dependent views. The multiplexed stream is divided into base view blocks 84 and dependent view blocks 82 (step 83).

A number of long jump capable points **86*i*, 86*j*, and 86*k* are identified and may be noted in any number of ways, including by the setting of “long jump capability flags” at such long jump capable points (step 87). The determination of where a long jump capable point 86*i* occurs is made by a calculation that includes a value of the local bit rate at a given block (step 85**). For example, the local bit rate employed may be an average bit rate of the block.

In a 2D case, the local bit rate employed in the above-noted calculation may be the average bit rate of the current base view block. A minimum block size may then be calculated which guarantees seamless 2D playback for a long jump. Two types of long jumps may be envisioned: (a) a jump over a layer break, and (b) a jump within a layer which may be up to 1.28 GB or 640,000 sectors. Each use case has a different jump time, so the minimum required block size is also different. If a current base view block’s size is greater than the minimum block size determined by the current base view block average bit rate, the current base view block can have a long jump capability flag set immediately after that block and still ensure seamless 2D playback.

In a 3D case, an average bit rate may still be employed, but this time it is of the 3D stream allocation block. A minimum block size is again calculated which guarantees the seamless 3D playback over a long jump. This aspect is generally the same as the 2D case, and again there are different lengths of jumps depending on the use case. If the 3D stream allocation block size is greater than the minimum block size, the current block can have a long jump capability flag set immediately after that block, and still ensure seamless 3D playback. Such analysis including the local bit rate may continue for each block.

For a given title, both the 2D case and the 3D case should have seamless playback guaranteed. Where both do, a long jump capability flag may be set directly after the current block. A detailed formula of a minimum size calculation is provided in the Blu-ray® disc specification.

It is noted in this context that the Blu-ray® Disc Specification at the section entitled Read-Only Format Part 3 (V2.4 or newer, latest version is V2.5) Part 3-1, Annex P.13.4 covers stream file allocation rules relating to the principles described here. In P.13.4.2, basic rules are provided and defined for Base View Blocks, Dependent View Blocks, and 3D Blocks. There are five such conditions (condition-1~5) defined in P.13.4.2.1~P.13.4.2.4. Condition-1 defined in P.13.4.2.1 relates to the minimum size calculation of a 2D block, where REXT[i] is the local bitrate of the 2D Block and TJUMP is the jump time. Condition-4 defined in P.13.4.2.3 relates to the minimum size calculation of a 3D block, where REXTSS is the local bitrate of a 3D Block and TJUMP is the jump time. The basic rules and Condition-2, 3, 5 are used when creating a pair of Base and Dependent view blocks before identifying the long jump capability.

After the long jump capable points are noted, layer breaks 86*i*' may be selected from these points, in some cases employing additional criteria. For example, the overall layer size should be kept within the maximum layer size, e.g., 25 GB in the case of current Blu-ray® discs. It may also be desired to keep the layer size as close as possible among multiple layers.

There is generally no need for a separate seamless playback condition check, as by selecting the layer break from a long jump capable point, seamless playback is generally guaranteed. A layer size check 92 may be performed (step 89), followed by creation of a file system image and/or master data 94 for replication (step 91).

Figure 7:
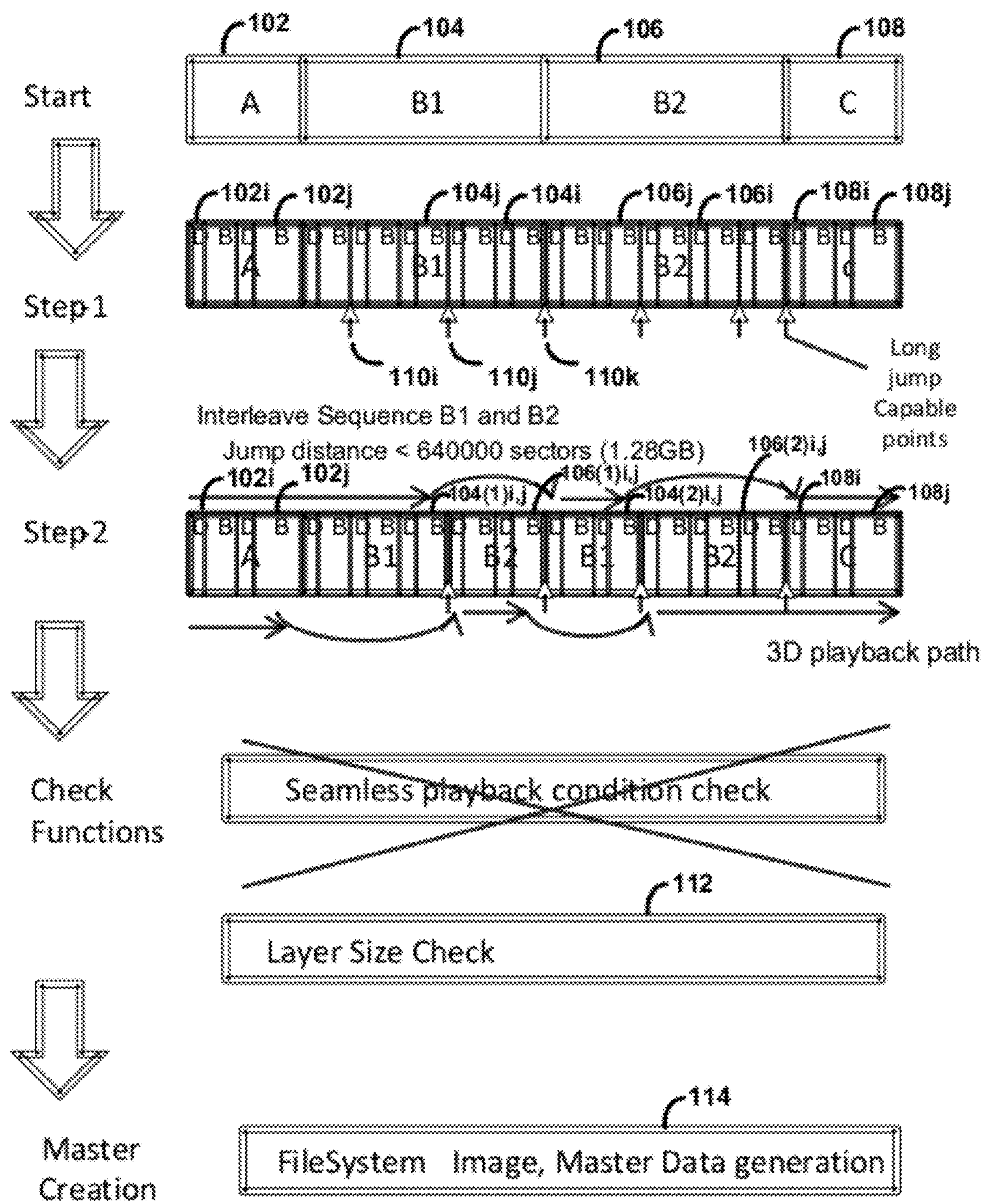
FIG. 7 illustrates a process according to principles disclosed here for preparing a 3D media stream to play smoothly even during long jumps between locations in a multi-story branching storyline, without buffer underruns.
Figure 8:
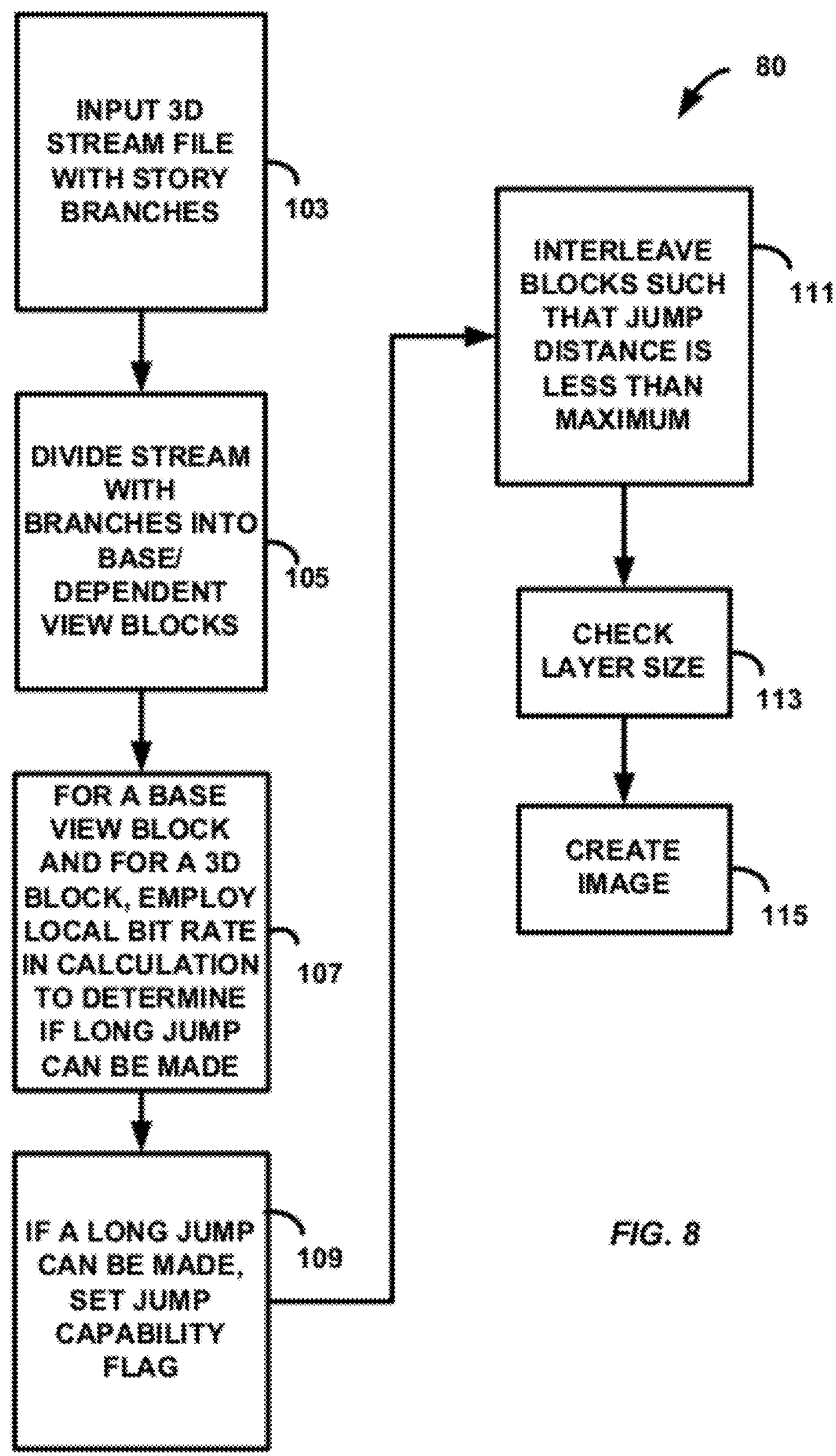
FIG. 8 illustrates a flowchart corresponding to FIG. 7.

Referring to FIGS. 7 and 8, a process 70 with accompanying flowchart 80 are illustrated according to another implementation of the invention. In this implementation, a 3D stream is prepared in such a way that seamless playback will occur in a multi-story branching title, again without the previously required seamless playback condition check.

Initially a 3D stream file having chapters A 102, B1/B2 104/106, and C 108 is input (step 103) and multiplexed into base and dependent views. The multiplexed stream is divided into base view blocks 102*j*, 104*j*, 106*j*, and 108*j*, and dependent view blocks 102*i*, 104*i*, 106*i*, and 108*i* (step 105).

A number of long jump capable points 110*i*, 110*j*, and 110*k* are identified and may be noted in any number of ways, including by the setting of "long jump capability flags" at such long jump capable points (step 109). The determination of where a long jump capable point 110*i* occurs is made by a calculation that includes a local bit rate at a given block (step 107). Aspects of this calculation are the same as that described above in connection with FIGS. 5-6.

Where B1 or B2 are larger than a maximum jump distance, the same are interleaved to keep the jump distance less than the maximum (step 111). In the case of current Blu-ray® discs, the maximum jump distance is about 1.28 GB. In addition, the interleaving is performed in such a way as to ensure that breaks between interleaved chapters occur at long jump capable points. For example, in FIG. 7, the interleaving is such that the "B" chapters are situated in a B1-B2-B1-B2 configuration, with blocks such as 106(1)*i,j* occurring prior to 104(2)*i,j* (for clarity, the B1 and B2 base and dependent view blocks are enumerated collectively as 104(1)*i,j* and 104(2)*i,j*, and 106(1)*i,j* and 106(2)*i,j*, respectively), to ensure that both the B1-B1 and B2-B2 jumps can occur seamlessly and without buffer under runs.

Again, there is generally no need for a separate seamless playback condition check, as by selecting the layer break from a long jump capable point, seamless playback is generally guaranteed. A layer size check 112 may be performed (step 113) to keep the layer size within the maximum layer size, e.g., 25 GB in the case of current Blu-ray® discs, followed by creation of a file system image and/or master data 114 for replication (step 115).

Additional aspects of certain implementations of the invention are now described. Referring to FIGS. 9(A)-(D), a number of blocks 90 are shown indicating base and dependent view blocks with various bit rates. In this aspect, by making the size of the last base view block of a 3D stream large, e.g., if necessary by adjusting the size of blocks prior to the last block, the possibility of making the last block long jump capable can be increased significantly.

In FIG. 9(A), the base view transport stream bit rate (blocks 116*j*, 118*j*, and 122*j*) is significantly larger than the dependent view transport stream bit rate (blocks 116*i*, 118*i*, and 122*i*). For example, the rate may be 35 Mbps. By transforming the blocks so that the final block 126Nj is much larger than before, e.g., greater than 12.6 MB, the possibility of having a long jump capability after that final block 126Nj is significantly increased. This transformation may entail decreasing the size of the penultimate block 124(N−1)j (and associated dependent view blocks 126Ni and 124(N−1)i). While an exemplary large block size of 12.6 MB has been disclosed above, it will be noted that such block sizes may be as large as 18.5 MB or more, and as small as 500 K.

In FIG. 9(B), the base view transport stream bit rate (blocks 116*j*, 118*j*, and 122*j*) is three times larger than the dependent view transport stream bit rate (blocks 116*i*', 118*i*', and 122*i*'). In many situations, this rate ratio may be viewed as a substantially ideal case. Again, the rate may be 35 Mbps but the dependent view transport stream rate increased over the case in (A). By transforming the blocks so that the final block 126Nj is much larger than before, e.g., again greater than 12.6 MB, the possibility of having a long jump capability after the final block 126Nj is significantly increased. This transformation may again entail decreasing the size of the penultimate block 124(N−1)j (and associated dependent view blocks 126Ni' and 124(N−1)i').

In FIG. 9(C), the base view transport stream bit rate (blocks 116*j*', 118*j*', and 122*j*') is substantially the same as the dependent view transport stream bit rate (blocks 116*i*", 118*i*", and 122*i*"). For example, the rate may be 23 Mbps. Similarly, by transforming the blocks so that the final block 126Nj' is larger than before, e.g., greater than 6.2 Mb, the possibility of having a long jump capability after that final block 126Nj' is significantly increased. This transformation may again entail decreasing the size of the penultimate block 124(N−1)j' (and associated dependent view blocks 126Ni" and 124(N−1)i").

In FIG. 9(D), a situation as shown in which the base view transport stream bit rate (blocks 116*j*", 118*j*", and 122*j*") is considered to change substantially with respect to the dependent view transport stream bit rate (blocks 116*i*'", 118*i*'", and 122*i*'"). For example, the rate may be 35 Mbps but may vary substantially. By transforming the blocks so that the final block 126Nj" is larger than before, e.g., greater than 12.6 Mb, the possibility of having a long jump capability after that final block 126Nj" is significantly increased. This transformation may again entail decreasing the size of the penultimate block 124(N−1)j" (and associated dependent view blocks 126Ni'" and 124(N−1)i'").

By means of this technique, the jump following the last block, which may take place to an arbitrary location on the disk, has a high probability of being seamless.

FIG. 10(A)-(D) illustrate a process to check, in a multi-story implementation, if a long jump is necessary and if so how to implement the same via interleaving. 3D stream 100 has a first chapter A (132), a last chapter C (136), and a middle chapter B that can be any of three alternative branches B1 (134*a*), B2 (134*b*), or B3 (134C). After playback of A 132, the longest jump required would be from the end of A 132 to the beginning of B3 134C, as shown by distance L1. Another potentially long jump would be from the end of B1 to the beginning of C, shown by distance L2.

Figure 10A:
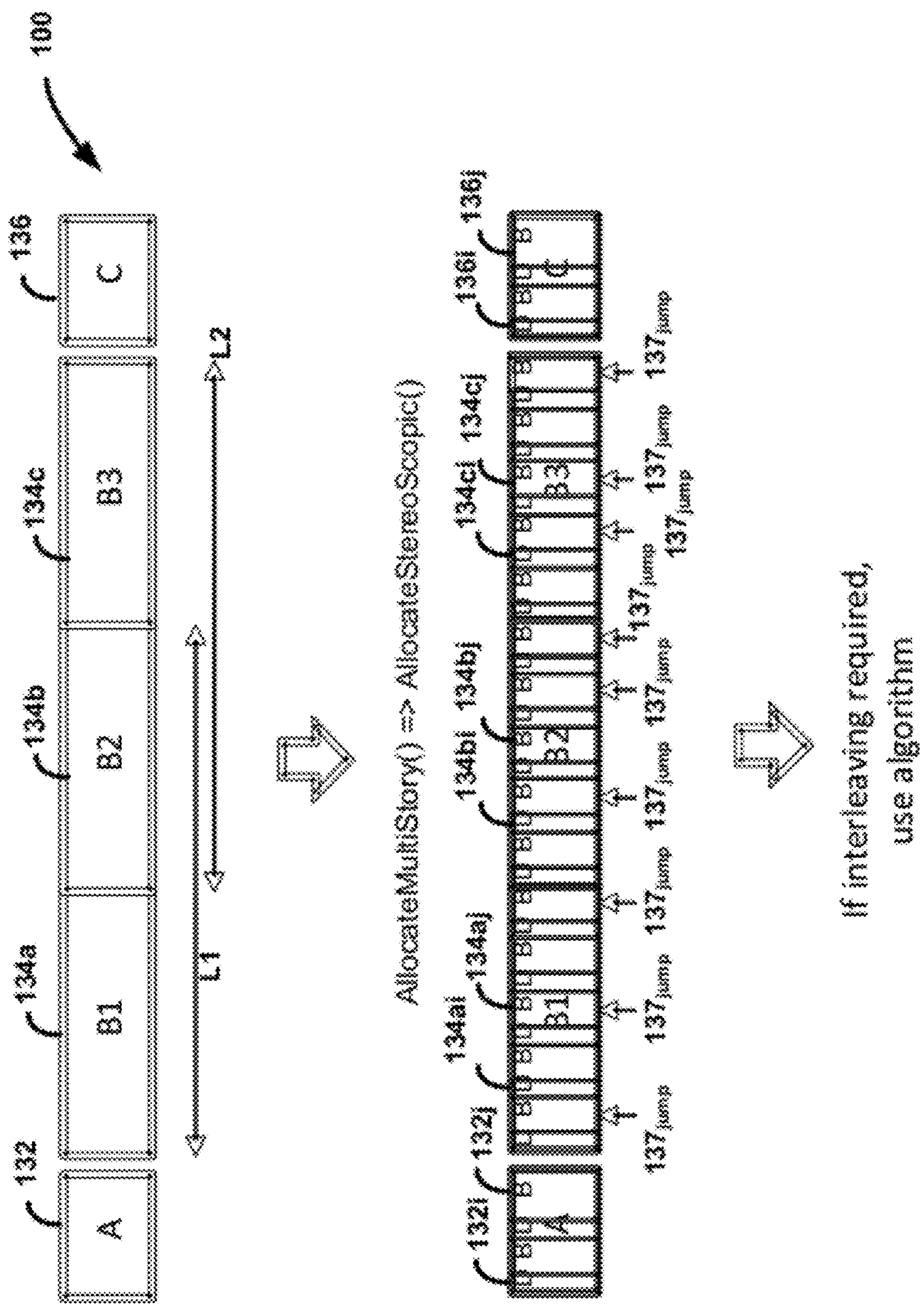
Figures 10B, 10D:
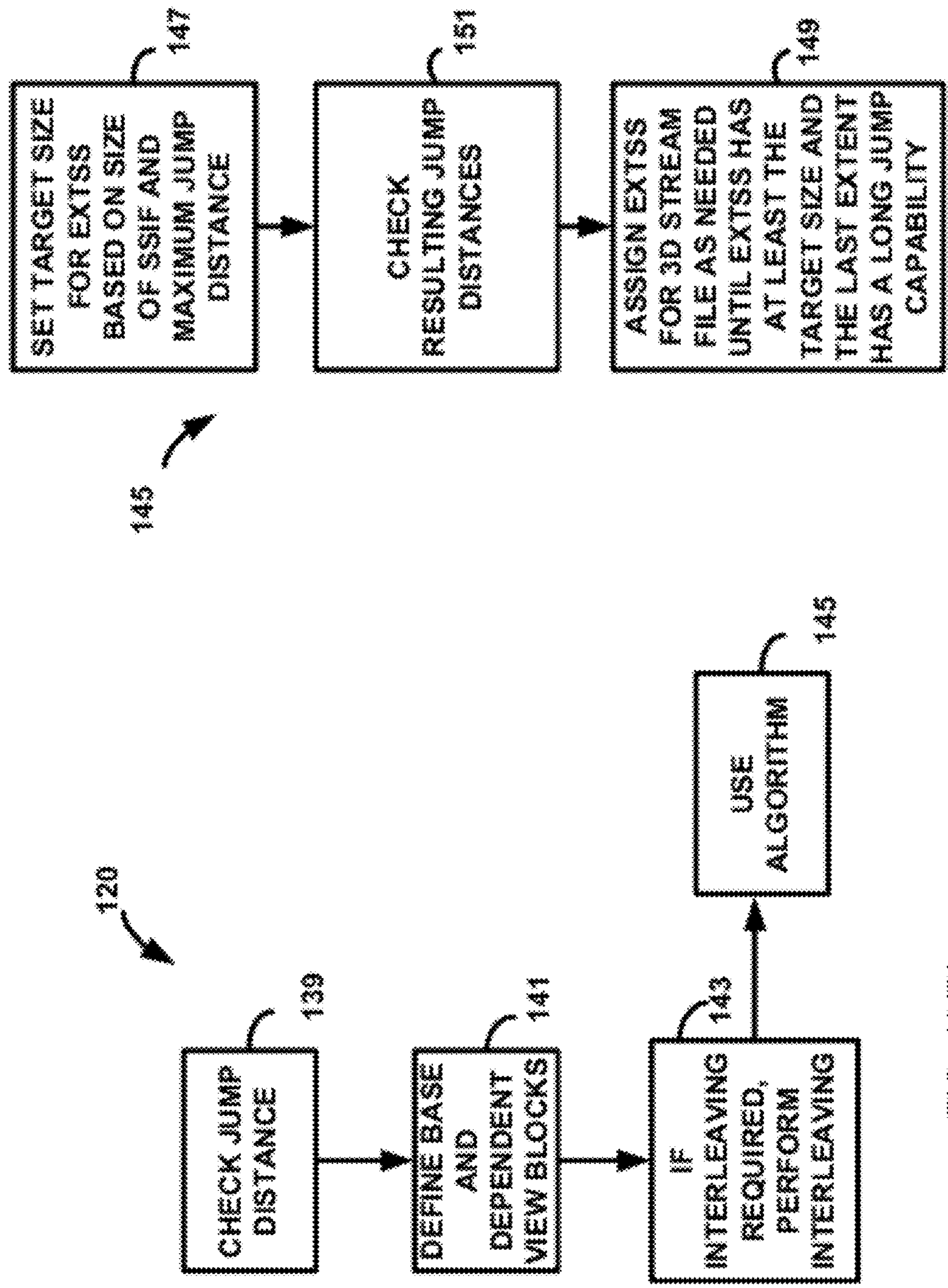

These distances, and any others within the multi-story branching, are then checked (step 139 of a method 120 shown in FIG. 10(B)) and if the jump distance in all possible playback paths is less than some maximum, e.g., 640,000 sectors, there is no need to perform any interleaving. As before, base view blocks and dependent view blocks are defined (step 141) for each 3D stream file, and the long jump capability flags $\mathbf{137}_{jump}$ are set. However, if interleaving is required (step 143), an algorithm may be employed to perform the same (step 145). And in this case the points of interleaving may be located at the jump capable points.

One such algorithm is that indicated by code 110 in FIG. 10(C). This algorithm performs several functions that are also indicated in the flowchart 145 of FIG. 10(D). The implemented algorithm sets a target size and number for the resulting stereoscopic extent blocks "EXTSS" based upon the total size of the SSIF files (step 147) in multi-story branching and the maximum jump distance, e.g., 640,000 sectors. Such EXTSS blocks generally refer to one contiguous sector allocation or one file allocation block. Such may be small, e.g., 1 min., or large, e.g., a half-hour portion of a movie.

One way of estimating the number of divisions is to take a total size X (in sectors) of files that belong to an interleaved group, e.g., B1, B2, and B3. This number may then be divided by the maximum number of sectors for a jump, e.g., 640,000. More precisely:

$$\text{Div\_num(initial value)}=\text{INT}(X/640{,}000+1)$$

For example, if X=320,000 sectors (~0.64 Gb), then Div-num (initial value)=1. This means interleaving may not be necessary, but the algorithm in code 110 may still be performed with Div_num (initial value)=1 to confirm all other conditions are satisfied. If X=6,400,000 sectors (12.8 Gb), then Div_num (initial value)=11. This means division to at least 11 separate blocks is necessary. Consequently, Div_num starts at 11 and may generally increase.

Figure 9:
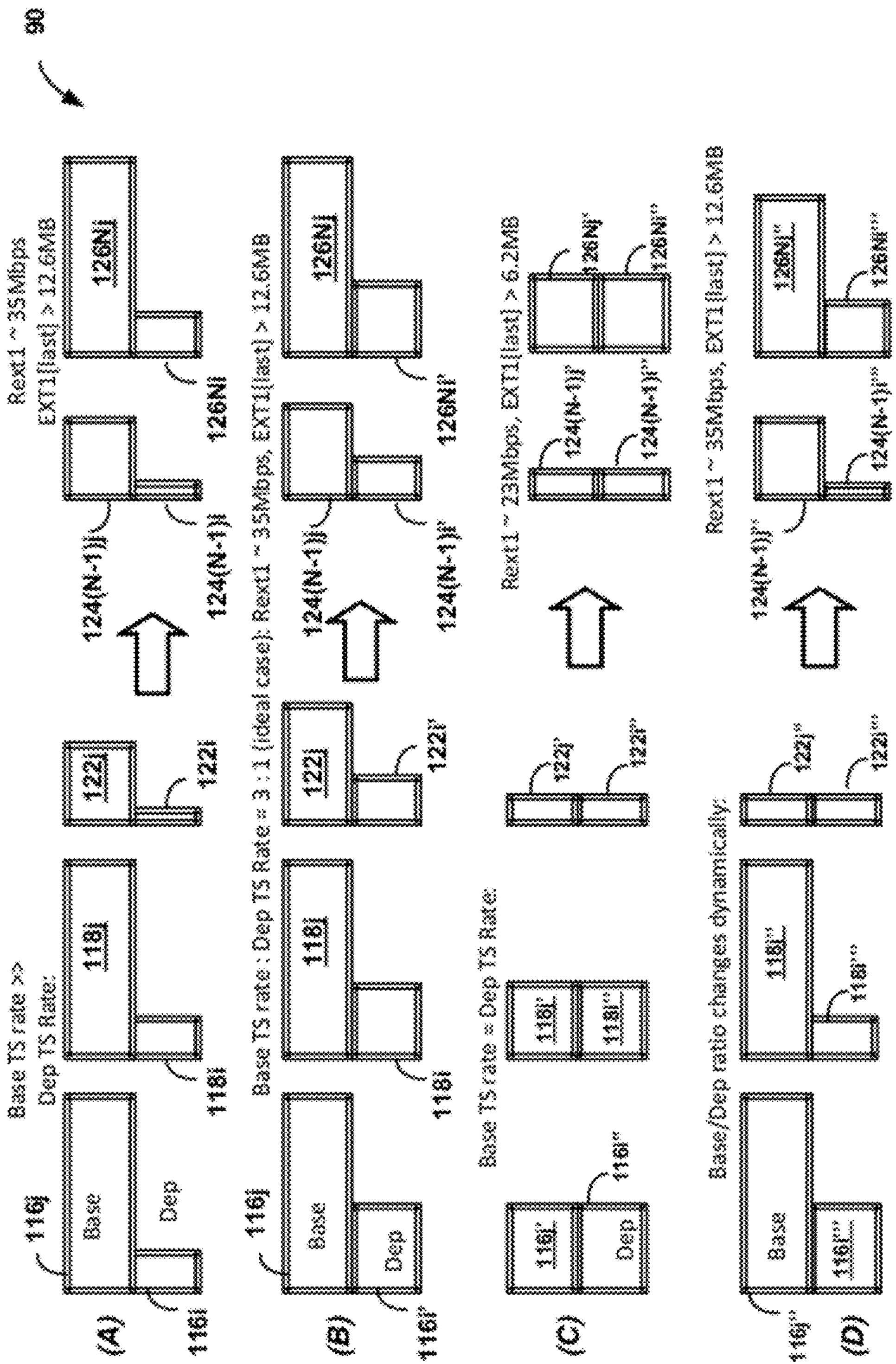
FIG. 9 illustrates another aspect according to the principles disclosed here that may be employed in certain implementations, for ensuring seamless playback at the end of a line of played back blocks.

Following the setting of the target size, and starting at the beginning, the algorithm assigns EXTSS for 3D stream file (as needed, as the same get divided for interleaving purposes) until the EXTSS has at least the target size and the last extent, e.g., "EXT1", has a long jump capability (step 149) (see also FIG. 9). When generating the next EXTSS for the SSIF file, the target may be adjusted down by the amount that the previous EXTSS exceeded its target size.

As noted in step 151, the resulting interleaved jump distances are checked to ensure that the longest jump distance is less than a maximum, e.g., 640,000 sectors. For example, if three SSIF files are interleaved, the jump distance check target will be for B1(*i*)+B2(*i*), B2(*i*)+B3(*i*), where "i" is up to the number of divisions Div_num. As the long jump capable point distribution is content dependent, relying on the local bit rate, the actual implementation may start with the estimated division number from the total data size of one interleaving group, e.g., B1+B2+B3. The system may then iteratively re-attempt interleaving with an incremented division number. If desired in a given implementation, a maximum number of iterations may be set.

Figure 11A:
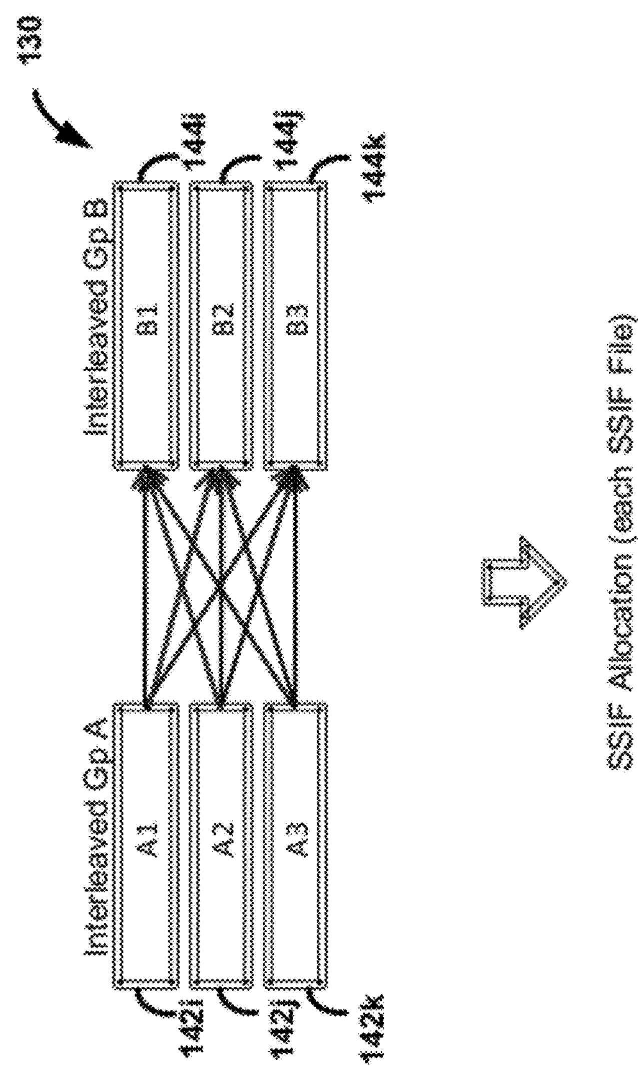
FIGS. 11(A)-(B) illustrates another aspect according to the principles disclosed here for multi-story branching that may be employed in certain implementations, showing multi-story branches that are occurring serially with other multi-story branches.

The above described scenarios discuss multi-story situations in which only one chapter has multiple branches. It will be understood that implementations of the system and method may be employed in situations where multiple chapters have multiple branches. For example, referring to FIG. 11(A), a chapter layout 130 is shown in which a story line A-B has multiple branches of A (A1 142*i*, A2 142*j*, and A3 142*k*) which lead to multiple branches of B (B1 144*i*, B2 144*j*, and B3 144*k*). Each Ai leads to three potential Bj, and thus nine combinations are possible.

Figure 11B:
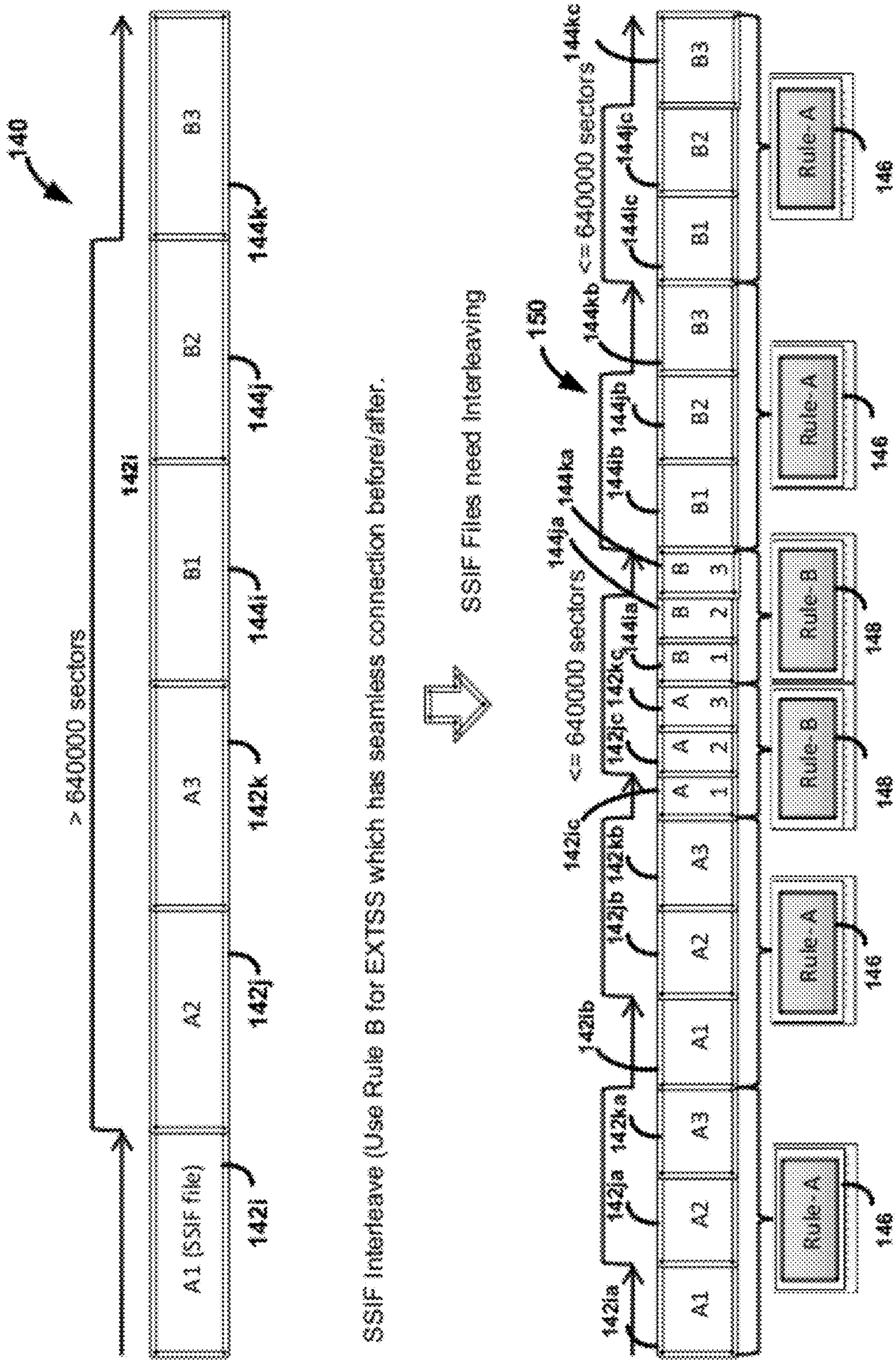

One typical default way of allocating these SSIF files is shown in FIG. 11(B) as allocation 140. However, as is clear, a jump from the end of SSIF file 142*i* to the beginning of SSIF file 144*k*, which in this case is the maximum long jump, could often be over 640,000 sectors. Thus interleaving is required. The bottom diagram in FIG. 11(B) shows just such an interleaving, and as noted above the points where SSIF files are interleaved should occur at appropriate jump capable points. As shown, the longest jumps required are below the maximum of 640,000 sectors, this maximum being termed "Rule-A". As is seen in this figure, and as is commonly encountered, the last EXTSS of the group A files and the first EXTSS of the group B files require smaller size EXTSS files in order to keep the longest jump (A1 to B3) within the required 640,000 sectors. This can be achieved by estimating the size of these EXTSS files to be roughly half of the prior EXTSS files, giving rise to a "Rule-B" where the jump distance is less than 320,000 sectors. Of course, it will be understood that variations of these rules may be employed in a given circumstance.

Figure 12:
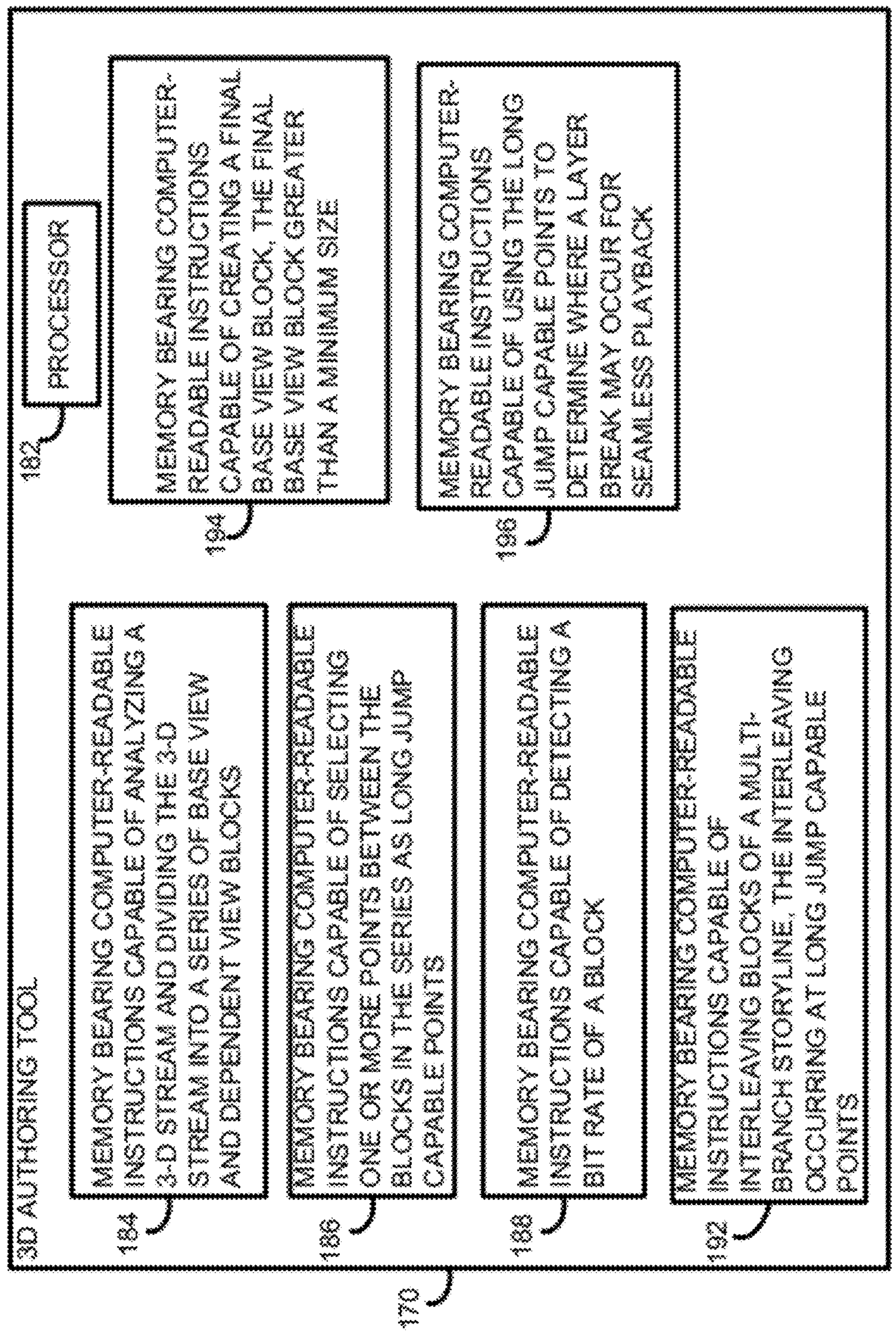
FIG. 12 illustrates a system view of a 2D or 3D authoring tool according to the principles disclosed here.

FIG. 12 illustrates a system 170 of a 3D authoring tool according to the principles described here. The system 170 includes a processor 182 and memory 184 bearing computer readable instructions capable of analyzing a 3D stream and dividing the 3D stream into a series of base view and dependent view blocks. It will be understood that when only a 2D output is desired, only the base view blocks need be created. The system 170 further includes memory 186 bearing computer readable instructions capable of selecting one or more points between the blocks in the series as long jump capable points. The memory 186 will typically call on memory 188 bearing computer readable instructions capable of detecting a bit rate of a block. Using the bit rate and potentially also the jump distance or other parameters, as described above, a point may be categorized as potentially long jump capable. Where such a point is so categorized, a long jump may be made from that point with a low probability of buffer underrun, thus increasing the chance of seamless playback. The system 170 may further include memory 192 bearing computer readable instructions capable of interleaving blocks of a multi-branch storyline, the interleaving occurring at long jump capable points. As noted above, the memory 192 may include algorithms for determining the number of blocks required, for adding blocks where required for interleaving, and the like. The system 170 may further include memory 194 bearing computer readable instructions capable of creating a final base view block, the final base view block having a larger size than at least one or more preceding blocks. The final base view block may be made larger by making some of the preceding blocks smaller, and consequently such blocks may have a smaller extent. The system 170 further includes memory 196 bearing computer readable instructions capable of using the long jump capable points to determine where a layer break may occur, again for seamless playback. Other memories will also be understood, including those necessary for testing layer size, and the like.

What has been disclosed in a 3D authoring tool which provides for protection against buffer underruns upon a long jump, which may occur when a jump from one media layer to another is made, or when a branch to a far sector is made in a multi-story media title.

Figure 13:
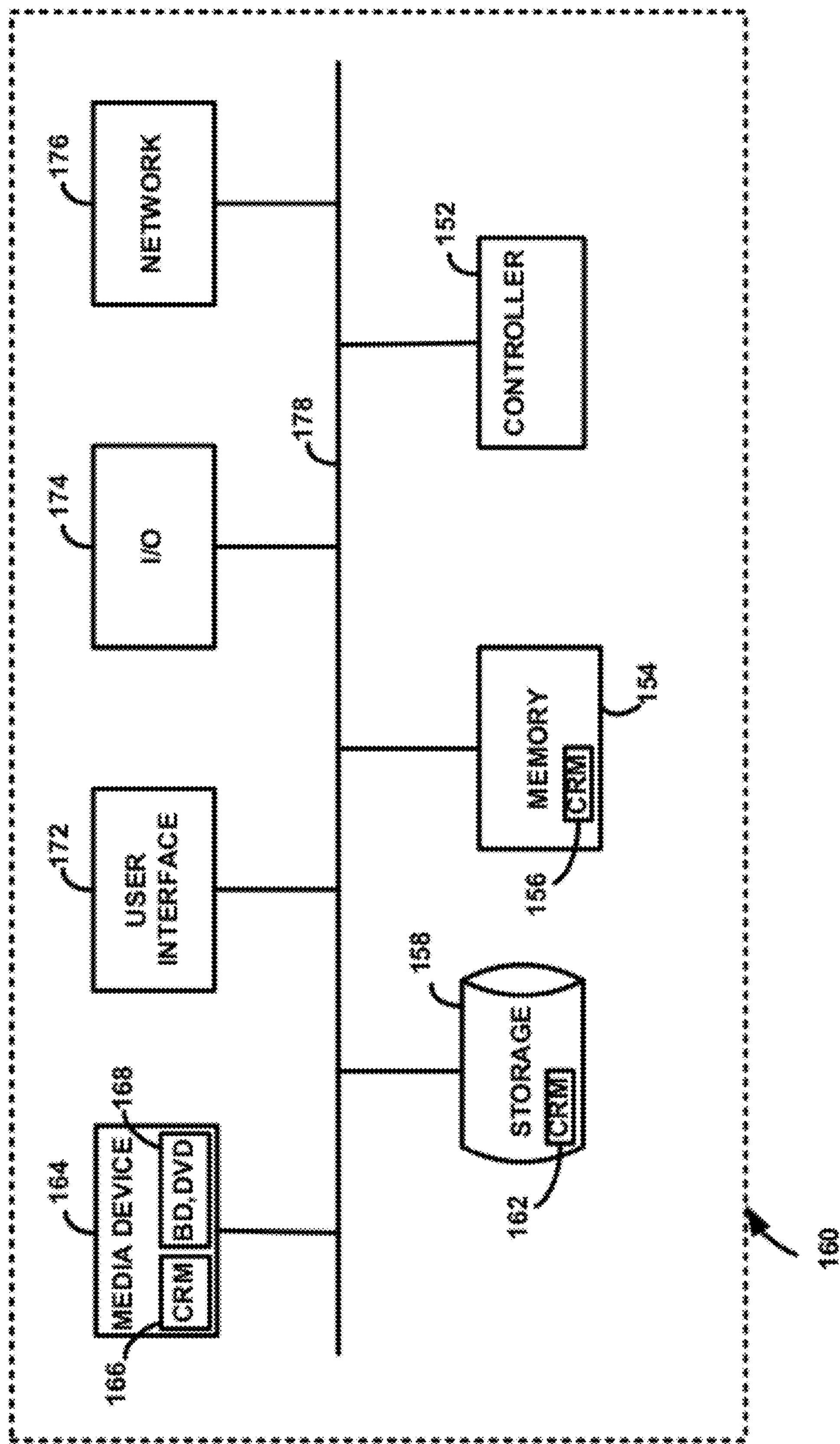
FIG. 13 illustrates an exemplary computing environment for a 2D or 3D authoring tool.

One implementation includes one or more programmable processors and corresponding computing system components to store and execute computer instructions, such as to execute the code that provides the 3D authoring tool. Referring to FIG. 13, a representation of an exemplary computing environment 160 is illustrated.

The computing environment includes a controller 152, a memory 156, storage 158, a media device 164, a user interface 172, an input/output (I/O) interface 174, and a network interface 176. The components are interconnected by a common bus 178. Alternatively, different connection configurations can be used, such as a star pattern with the controller at the center.

The controller 152 includes a programmable processor and controls the operation of the computing environment and its components. The controller 152 loads instructions from the memory 154 or an embedded controller memory (not shown) and executes these instructions to control the system. In its execution, the controller 152 may provide the functionality described above as, in part, a software system. Alternatively, the same may be implemented as separate modular components in the controller 152.

Memory 154, which may include non-transitory computer-readable memory 156, stores data temporarily for use by the other components of the system. In one implementation, memory 154 is implemented as RAM. In other implementations, memory 154 also includes long-term or permanent memory, such as flash memory and/or ROM.

Storage 158, which may include non-transitory computer-readable memory 162, stores data temporarily or long-term for use by components of the system. In one implementation, storage 158 is a hard disc drive or a solid state drive.

The media device 164, which may include non-transitory computer-readable memory 166, receives removable media and reads and/or writes data to the inserted media. In one implementation, the media device 164 is an optical disc drive or disc burner, e.g., a writable Blu-ray® disc drive 168.

The user interface 172 includes components for accepting user input, e.g., the user content selections, from users and presenting information to the same. In one implementation, the user interface 172 includes a keyboard, a mouse, audio speakers, and a display. The controller 152 uses input from the user to adjust the operation of the authoring tool.

The I/O interface 174 includes one or more I/O ports to connect to corresponding I/O devices, such as external storage or supplemental devices, e.g., a printer or a PDA. In one implementation, the ports of the I/O interface 174 include ports such as: USB ports, PCMCIA ports, serial ports, and/or parallel ports. In another implementation, the I/O interface 174 includes a wireless interface for wireless communication with external devices. These I/O interfaces may be employed to connect to one or more content playback devices.

The network interface 176 allows connections with the local network and includes a wired and/or wireless network connection, such as an RJ-45 or Ethernet or "WiFi" interface (802.11). Numerous other types of network connections will be understood to be possible, including WiMax, 3G or 4G, 802.15 protocols, 802.16 protocols, satellite, Bluetooth®, or the like.

The computing environment may include additional hardware and software typical of such devices, e.g., power and operating systems, though these components are not specifically shown in the figure for simplicity. In other implementations, different configurations of the devices can be used, e.g., different bus or storage configurations or a multi-processor configuration.

Various illustrative implementations of the present invention have been described. However, one of ordinary skill in the art (given this teaching) will recognize that additional implementations are also possible and within the scope of the present invention.

For example, the technique could be adapted to other types of mixed content, rather than just 2D and 3D streams.

Accordingly, the invention is to be limited only by the claims appended hereto, and equivalents thereto.

The invention claimed is:

1. A method of preparing a 3D media stream such that long jumps do not result in buffer underruns, comprising:

a) receiving a 3D media stream;

b) dividing the 3D media stream into a set of base view blocks and dependent view blocks, each pair of base view block and associated dependent view block constituting a 3D block;

c) for a first base view block, employing at least a local bit rate in a calculation to determine if a long jump during 2D playback may be made to a second base view block without the occurrence of a buffer underrun;

d) for a first 3D block, employing at least a local bit rate in a calculation to determine if a long jump during 3D playback may be made to a second 3D block without the occurrence of a buffer underrun;

e) if a long jump may be made to the second base view block and 3D block without the occurrence of a buffer underrun, then configuring the media stream to allow long jumps following the first base view block; and f) creating a file system image or master disc image from the divided and configured media stream.

2. The method of claim 1, wherein the configuring includes setting a jump capability flag at the first base view block.

3. The method of claim 2, wherein each block has a temporal beginning and a temporal end, and wherein the setting includes setting the jump capability flag at the temporal end of the first block.

4. The method of claim 1, wherein the local bit rate is an average bit rate of a block.

5. The method of claim 1, further comprising for a first dependent view block, using at least a local bit rate to determine if a long jump may be made to another block without the occurrence of a buffer underrun, and if so, then setting a jump capability flag following the first dependent view block.

6. The method of claim 1, wherein the employing further comprises employing a jump distance in the calculation to determine if a long jump can be made to a second block without the occurrence of a buffer underrun.

7. The method of claim 1, wherein each base view block has a minimum size requirement, and wherein the 3D media stream has a beginning base view block and an ending base view block, and wherein the ending base view block has an extent that is as large as possible while maintaining the minimum size requirement for the base view blocks that precede it.

8. The method of claim 7, wherein the ending base view block has an extent that is larger than that of the base view blocks that precede it in the 3D media stream.

9. The method of claim 1, wherein the average local bit rate of the base view blocks is between two and four times the average local bit rate of the dependent view blocks.

10. The method of claim 1, further comprising configuring the file system image or master disc image for a Blu-ray Disc®.

11. The method of claim 1, wherein the local bit rate is employed in a calculation of a minimum block size, and if a given base view block size is greater than the minimum block size, and if a given 3D block size is greater than the minimum block size, then allowing a long jump at the given base view and 3D block.

12. The method of claim 1, wherein the long jump is associated with a media layer jump.

13. The method of claim 12, wherein a plurality of jump capability flags are set at locations where long jumps may be made without the occurrence of buffer underruns, and wherein the creating includes selecting a layer break from among the jump capability flag locations, the layer break selected to keep a layer size less than a maximum layer size.

14. The method of claim 13, wherein the selecting further comprises selecting the layer break such that layers created thereby have a layer size within a predetermined range of sizes.

15. The method of claim 1, wherein a plurality of jump capability flags are set at locations where long jumps may be made without the occurrence of buffer underruns, and wherein the long jump is associated with a multi-story branching point.

16. The method of claim 15, wherein the set of base view blocks and dependent view blocks are further organized into story chapters, at least one story chapter divided into a plurality of branches, and further comprising:

a) subdividing at least one branch into two or more groups of base and dependent view blocks; and b) interleaving at least one group of base and dependent view blocks associated with one branch into a point between two groups of base and dependent view blocks associated with another branch, the point chosen at the location of a jump capability flag, and where a jump distance associated with the long jump is less than a maximum jump distance.

17. The method of 16, wherein the maximum jump distance is between 320000 sectors and 640000 sectors.

18. A non-transitory computer-readable medium, comprising instructions for causing a computing device to perform the method of claim 1.

* * * * *